(12) United States Patent
Sarwar et al.

(10) Patent No.: US 8,477,619 B2
(45) Date of Patent: Jul. 2, 2013

(54) METHOD AND SYSTEM FOR DISTRIBUTED VIRTUAL TRAFFIC MANAGEMENT

(75) Inventors: Muhammad Sakhi Sarwar, Brookfield, CT (US); Ali Zaringhalam, North Caldwell, NJ (US); Stephen Joseph Brolin, Livingston, NJ (US); Simmonds John Mathews, Southbury, CT (US); Richard Charles Boelens, Grand View, NY (US); Frank Schumeg, Samdyston, NJ (US)

(73) Assignee: Fujitsu Limited, Kawasaki-shi (JP)

( * ) Notice: Subject to any disclaimer, the term of this patent is extended or adjusted under 35 U.S.C. 154(b) by 285 days.

(21) Appl. No.: 12/879,375

(22) Filed: Sep. 10, 2010

(65) Prior Publication Data

US 2012/0063312 A1 Mar. 15, 2012

(51) Int. Cl.
*H04L 12/24* (2006.01)
*H04L 1/22* (2006.01)
*H04L 29/14* (2006.01)

(52) U.S. Cl.
USPC ............ 370/235; 370/216; 370/217; 370/229

(58) Field of Classification Search
None
See application file for complete search history.

(56) References Cited

U.S. PATENT DOCUMENTS

| | | | | |
|---|---|---|---|---|
| 5,247,513 | A * | 9/1993 | Henrion et al. | 370/396 |
| 2005/0185582 | A1* | 8/2005 | Wybenga et al. | 370/230 |
| 2006/0140128 | A1* | 6/2006 | Chi et al. | 370/241 |
| 2007/0171905 | A1* | 7/2007 | Dai | 370/389 |
| 2007/0171906 | A1* | 7/2007 | Dai | 370/389 |
| 2007/0263535 | A1* | 11/2007 | Shabtay | 370/230 |
| 2008/0062876 | A1* | 3/2008 | Giroux et al. | 370/235 |
| 2008/0240113 | A1* | 10/2008 | Arad et al. | 370/395.53 |

* cited by examiner

*Primary Examiner* — Andrew Chriss
*Assistant Examiner* — Joshua Kading
(74) *Attorney, Agent, or Firm* — Baker Botts L.L.P.

(57) ABSTRACT

According to one embodiment, methods and systems may be configured to support client-to-network, network-to-client, and network-to-network flows in a network element including multiple plug-in units. Such support may include policing and shaping flows as aggregates across plug-in units, combining outputs of two upstream traffic managers to network ports on two plug-in units, combining network flows that ingress two plug-in units, and shaping traffic to client ports.

6 Claims, 6 Drawing Sheets

METHOD AND SYSTEM FOR DISTRIBUTED VIRTUAL TRAFFIC MANAGEMENT

RELATED APPLICATION

This application is related to copending patent application entitled "Method and System for Virtualized Forwarding," application Ser. No. 12/879,257, filed on Sep. 10, 2010.

This application is also related to copending patent application entitled "Method and System for Contextualized Flow Tags," application Ser. No. 12/879,326, filed on Sep. 10, 2010.

TECHNICAL FIELD OF THE DISCLOSURE

The present disclosure relates generally to networked communications and, more particularly, to a method and system for management of distributed virtual traffic management.

BACKGROUND

A communication network may include network elements that route packets through the network. Some network elements may include a distributed architecture, wherein packet processing may be distributed among several subsystems of the network element (e.g., line cards, switches, and traffic managers). In some instances, a network element used in a communication network may be a multi-function Ethernet aggregation network element. A multi-function Ethernet aggregation network element may be one which supports many functions, including without limitation link aggregation, virtual LAN (VLAN) detection, and traffic management/shaping.

A multi-function Ethernet aggregation network element may include a distributed architecture including one or more plug-in units (PIUs). A PIU may comprise a modular electronic device that provides any suitable network communication functionality. For example, a PIU may include, among other things, an switch (e.g., an Ethernet switch) for switching traffic through the network element and a traffic manager for shaping and/or policing network flows.

In many instances, communication networks may employ link aggregation. Link aggregation (e.g., IEEE 802.1AX-2008) may generally describe the practice of using multiple network cables or ports in parallel to increase the link speed beyond the limits of any one single cable or port, and to increase redundancy for higher availability. In link aggregation, a group or set of ports may be combined and represented as a single logical port to other components of the network system. Various switching elements of the network system may "see" the aggregated ports (known as a "link aggregation group" or "LAG") as a single logical communication port in the routing tables or databases of network elements external to the LAG.

In addition, to ensure high reliability and availability in communications networks, protection switching is often used. When implemented, protection switching typically provides a primary or "working" path for a network and a redundant or "protection" path for the network. Accordingly, each path of a protection group may be monitored, and if a failure is detected on the working path, network traffic may be switched to the protection path. An example of protection switching may be Ethernet Linear Protection Switching (ELPS) as defined by the ITU G.8031 standard.

In a multi-function Ethernet aggregation network element, the path of traffic to an egress port of the network element may depend on numerous factors. For example, the path to egress may depend on selected internal system links. For example, related network flows may need to be combined to a traffic manager device in an appropriate manner, including flows from different ingress ports of the same LAG (e.g., a 0:N LAG) from two or more PIUs in a network element. Additionally, bandwidth of individual internal system links may not be adequate to carry all ingress traffic, which may require spreading traffic among multiple internal links Path to egress may also depend whether egress comprising a single port or a LAG, and whether a VLAN associated with the traffic is part of a protection group (e.g., ITU G.8031 protection group). Having established a path to egress, the path may be switched due to an egress protection switch via link aggregation, a protection group protection switch, and/or other occurrence. Such protection switching must occur quickly in order to satisfy relevant communications standards (e.g., ITU G.8031), which requires switching flows as groups, rather than as individual flows. Such path switching must also be accomplished while efficiently utilizing the resources of a network element, which may also require switching flows of groups, in order to conserve Ethernet device classification and policy resources. All of the above may require that internal links of traffic be specified. However, traditional network element components generally provide for identifying specific egress destinations, and not internal links.

In addition, in a multi-function Ethernet aggregation network element, the identity of a flow of traffic may depend on many factors. For example, flows may require device-unique labels as they travel through various logic engines in a switch. The label may identify the flow with sufficient resolution such that all packets of traffic with the same label undergo identical treatment in a logic engine. Thus, on ingress, flows may need to be identified more specifically in order to allow specific treatment for such flows. On egress, flows can be treated in the aggregate. As an illustrative example, flows may enter a client port of a network element with different customer VLAN tags (also known as C-tags). On ingress, each flow may be classified and processed per its VLAN C-tag, or a label traceable to such tag. Groups of these customer flows may receive an additional subscriber VLAN tag (also known as an S-tag) on egress. On egress, these flows may be classified and identified by their S-tag, or a label traceable to such tag. In both ingress and egress, it may be required that the flows be device unique, and labels such as C-tags and S-tags which require classification on system ingress and egress for uniqueness may not be device unique. Uniqueness must be assured by the flow architecture and VLAN assignments within the device, which traditional network element architectures do not allow. In addition, for protection switching, on egress it may be necessary to assign a different egress identifier to a flow for working path and protection path, which may double the number of labels destined for egress. This may cause scalability problems if the labels as defined on ingress also need to be doubled. Traditional network architectures do not provide an efficient means by which to remedy this scalability issue.

Further, traffic managers may be used in network elements in order to police flows from clients and to shape network flows from a client to a network and from a network to a client. Often, a single traffic manager in a network element may not have the bandwidth sufficient to handle all flows or a PIU including the traffic manager may not have enough ports to be sufficient for communications requirements. In addition, a single traffic manager may not provide redundancy. Accordingly, a distribution of traffic management tasks among two or more traffic managers in a network element may be desirable. However, traditional network element architectures do not readily support such distributed traffic management.

SUMMARY

According to one embodiment, a method may include receiving a frame via an ingress port of a network element. The method may also include assigning a virtual destination address to the frame of the traffic. The method may further include internally switching the frame within the network element based on the virtual destination address. The method may additionally include modifying the virtual destination address one or more times such that the virtual destination address is translated to an actual destination address identifying an actual egress port of the network element. Moreover, the method may include routing the frame to an egress port of the network element based on the actual destination address.

According to another embodiment, a method may include assigning a virtual local area network (VLAN) ingress connection identifier (iXid) to a frame upon ingress. The method may also include classifying a traffic flow for which the frame is a part through ingress engines of the network element based on the iXid. The method may further include swapping the iXid for an egress connection identifier (eXid) in the frame. The method may additionally include policing or shaping the traffic flow based on at least one of the iXid and the eXid. Moreover, the method may include classifying the traffic flow through egress engines of the network element based on the eXid.

According to a further embodiment, methods and systems may be configured to support client-to-network, network-to-client, and network-to-network flows in a network element including multiple plug-in units.

One or more other technical advantages of the disclosure may be readily apparent to one skilled in the art from the figures, descriptions, and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
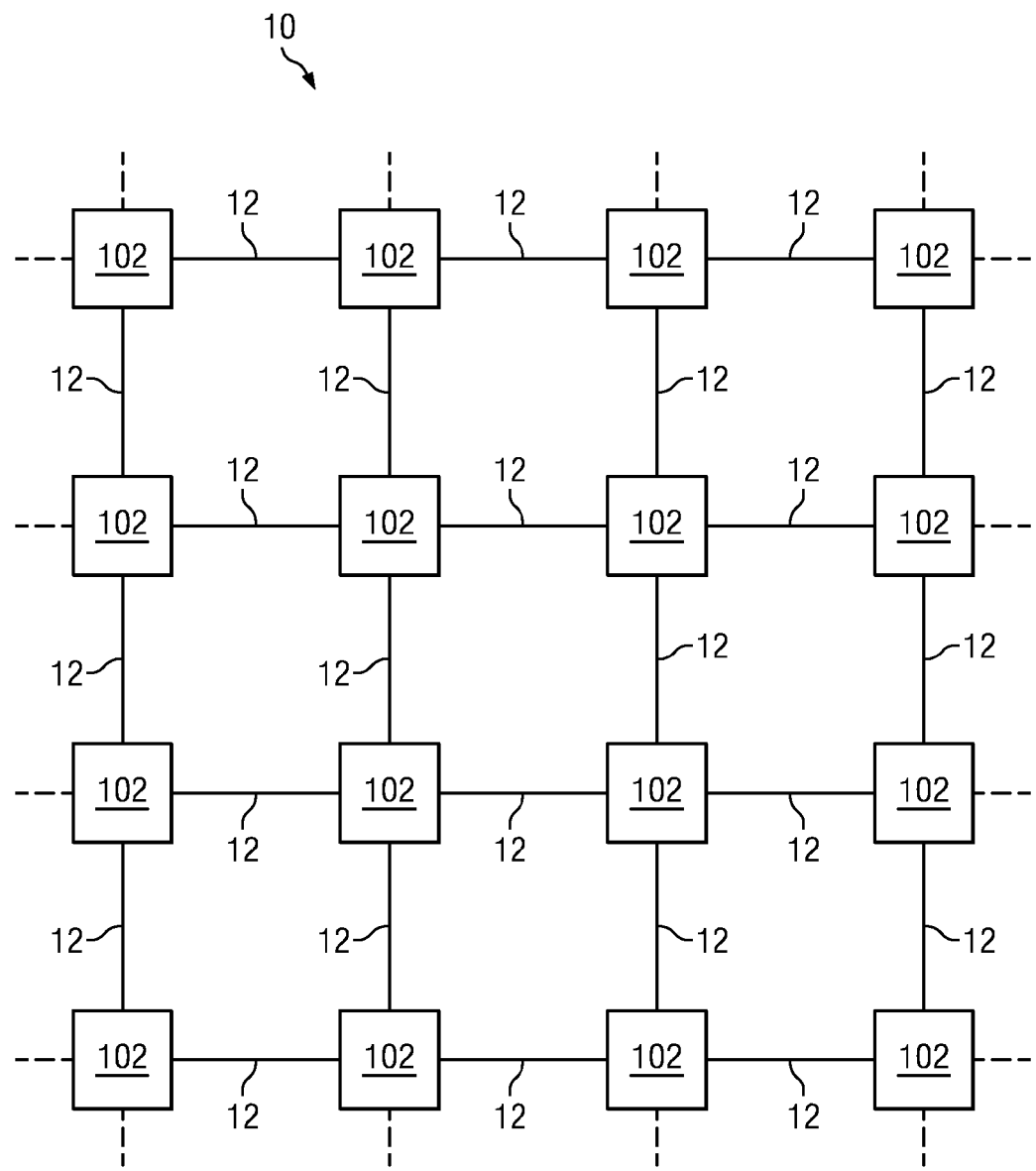
FIG. 1 illustrates a block diagram of an example communication network, in accordance with certain embodiments of the present disclosure.

FIG. 1 illustrates a block diagram of an example network 10, in accordance with certain embodiments of the present disclosure. In certain embodiments, network 10 may be an Ethernet network. Network 10 may include one or more transmission media 12 operable to transport one or more signals communicated by components of network 10. The components of network 10, coupled together by transmission media 12, may include a plurality of network elements 102. In the illustrated network 10, each network element 102 is coupled to four other nodes. However, any suitable configuration of any suitable number of network elements 102 may create network 10. Although network 10 is shown as a mesh network, network 10 may also be configured as a ring network, a point-to-point network, or any other suitable network or combination of networks. Network 10 may be used in a short-haul metropolitan network, a long-haul inter-city network, or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, a T1 cable, a WiFi signal, a Bluetooth signal, or other suitable medium.

Network 10 may communicate information or "traffic" over transmission media 12. As used herein, "traffic" means information transmitted, stored, or sorted in network 10. Such traffic may comprise optical or electrical signals configured to encode audio, video, textual, and/or any other suitable data. The data may also be real-time or non-real-time. Traffic may be communicated via any suitable communications protocol, including, without limitation, the Open Systems Interconnection (OSI) standard and Internet Protocol (IP). Additionally, the traffic communicated in network 10 may be structured in any appropriate manner including, but not limited to, being structured in frames, packets, or an unstructured bit stream.

Each network element 102 in network 10 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

Figure 2:
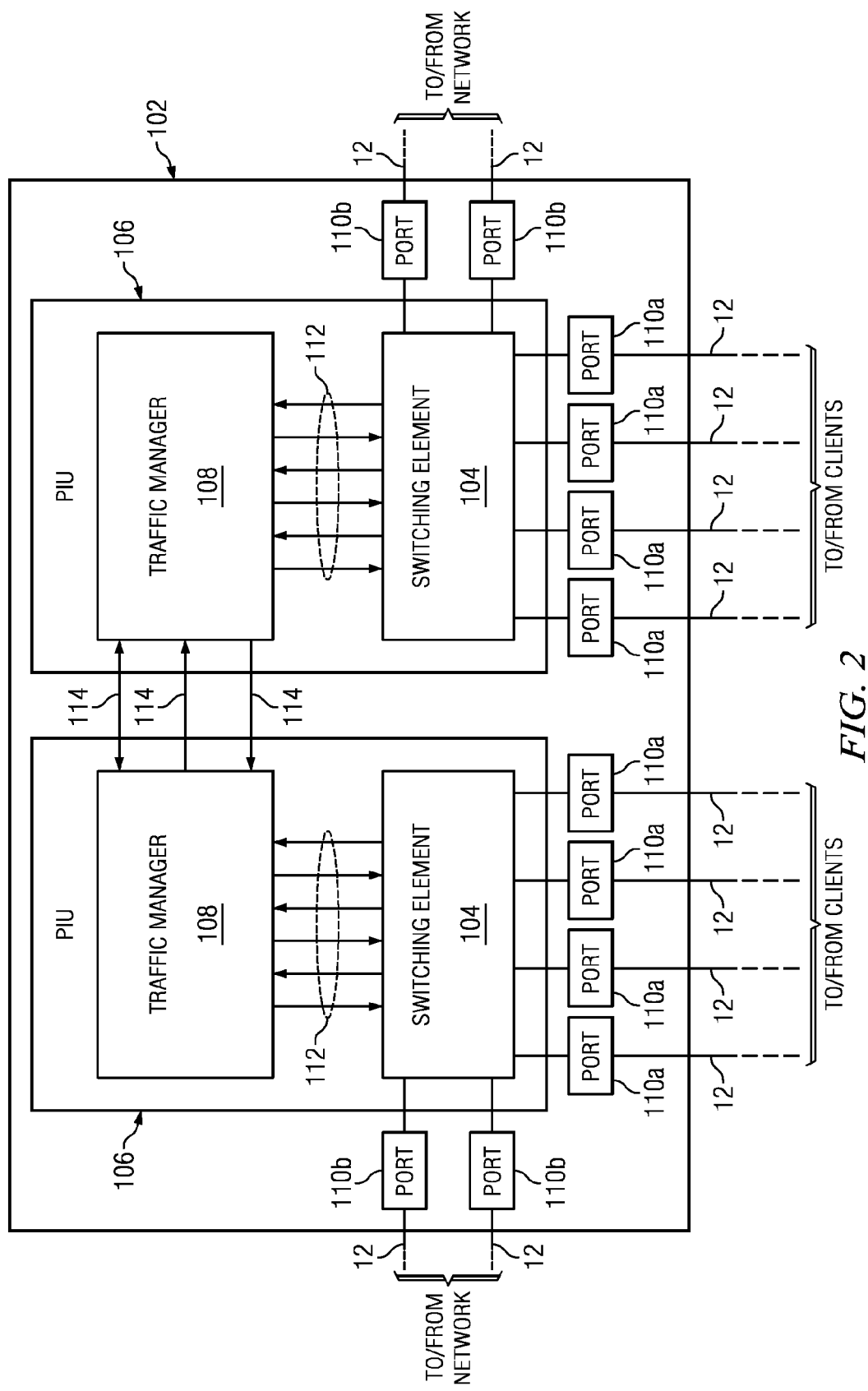
FIG. 2 illustrates a block diagram of an example network element, in accordance with certain embodiments of the present disclosure.

FIG. 2 illustrates a block diagram an example network element 102, in accordance with certain embodiments of the present disclosure. As discussed above, each network element 102 may be coupled to one or more other network elements 102 via one or more transmission media 12. Each network element 102 may generally be configured to receive data from and/or transmit data to one or more other network elements 102. In certain embodiments, network element 102 may comprise a switch configured to route data received by network element 102 to another device (e.g., another network element 102) coupled to network element 102.

As depicted in FIG. 2, each network element 102 may include a plurality of plug-in units (PIU) 106, ports 110 interfaced between PIUs 106s and transmission media 12, and one or more inter-PIU links 114.

A PIU 106 may include any system, device, or apparatus having plug-in terminals so that some or all electrical connections of the PIU 106 can be made engaging the unit with a suitable socket of network element 102. As shown in FIG. 2, a PIU 106 may include a switching element 104, a traffic manager 108, and intra-PIU links 112.

A switching element 104 may include any suitable system, apparatus, or device configured to receive ingressing traffic via a port 110 and route such traffic to a particular egress port 110 based on analyzing the contents of the data (e.g., a destination address of a packet of traffic) and/or based on a characteristic of a signal carrying the data (e.g., a wavelength and/or modulation of the signal). In certain embodiments, a switching element 104 may include a switch fabric (SWF). Additional functionality of a switching element 104 is discussed in greater detail below with respect to FIGS. 3-6.

A traffic manager 108 may be communicatively coupled to a switching element on the same PIU 106 via intra-PIU links 112, and may include any suitable system, apparatus, or device configured to police and/or shape flows of traffic. Traffic shaping is the control of traffic flows in order to optimize or guarantee performance, improve latency, and/or increase usable bandwidth by delaying packets of traffic that meet certain criteria. More specifically, traffic shaping is any action on a flow of packets which imposes additional delay on packets such that they conform to some predetermined constraint (e.g., a service-level agreement or traffic profile). Traffic policing is the process of monitoring network traffic for compliance with a service-level agreement and taking action to enforce such agreement. For example, in traffic policing, traffic exceeding a service-level agreement may be discarded immediately, marked as non-compliant, or left as-is, depending on an administrative policy and the characteristics of the excess traffic. Additional functionality of a traffic manager 108 is discussed in greater detail below with respect to FIGS. 3-6.

An intra-PIU link 112 may include any system, device, or apparatus configured to communicatively couple a switching element 104 to a traffic manager 108 and communicate information between a switching element 104 and its corresponding traffic manager 108. For example, an intra-PIU link 112 may include an optical fiber, a metal wire, a printed wiring board path, or other suitable medium.

A port 110 may be communicatively coupled to a switching element 104 and may include any suitable system, apparatus, or device configured to serve as an interface between a network element 102 and a transmission medium 12. A port 110 may enable its associated network element 102 to communicate to other network elements 102 using any suitable transmission protocol and/or standard. A port 110 may be implemented using hardware, software, or any combination thereof. For example, a port 110 may comprise an Ethernet port, an optical port, or any other suitable port. As shown in FIG. 2, some of ports 110 (e.g., ports 110*a*) may be interfaced to clients (e.g., customers) of a network provider while other of ports 110 (e.g., ports 110*b*) may be interfaced to the provider network. In addition, in some embodiments, a portion of client ports 110*a* interfaced to a switching element 104 may be optical ports (e.g., are interfaced to transmission media comprising optical fiber) while the other portion of client ports 110*a* interfaced to the switching element 104 may be metal-wire ports (e.g., are interfaced to transmission media comprising Ethernet cable).

In certain embodiments, two or more physical ports 110 of a particular network element 102, their corresponding physical ports 110 of another network element 102, and their corresponding transmission media 12 may be grouped into a link aggregation group (LAG). A LAG may include any suitable number of member physical ports 110 and may combine its member ports using link aggregation such that the member ports are represented as a single logical port to components of network 10 external to the LAG.

An inter-PIU link 114 may include any system, device, or apparatus configured to communicatively couple a traffic manager 108 of one PIU 106 to a traffic manager 108 of another PIU 106 and communicate information between corresponding traffic manager 108. For example, an inter-PIU link 114 may include an optical fiber, a metal wire, paths on a backplane wiring board, or other suitable medium.

Figure 3:
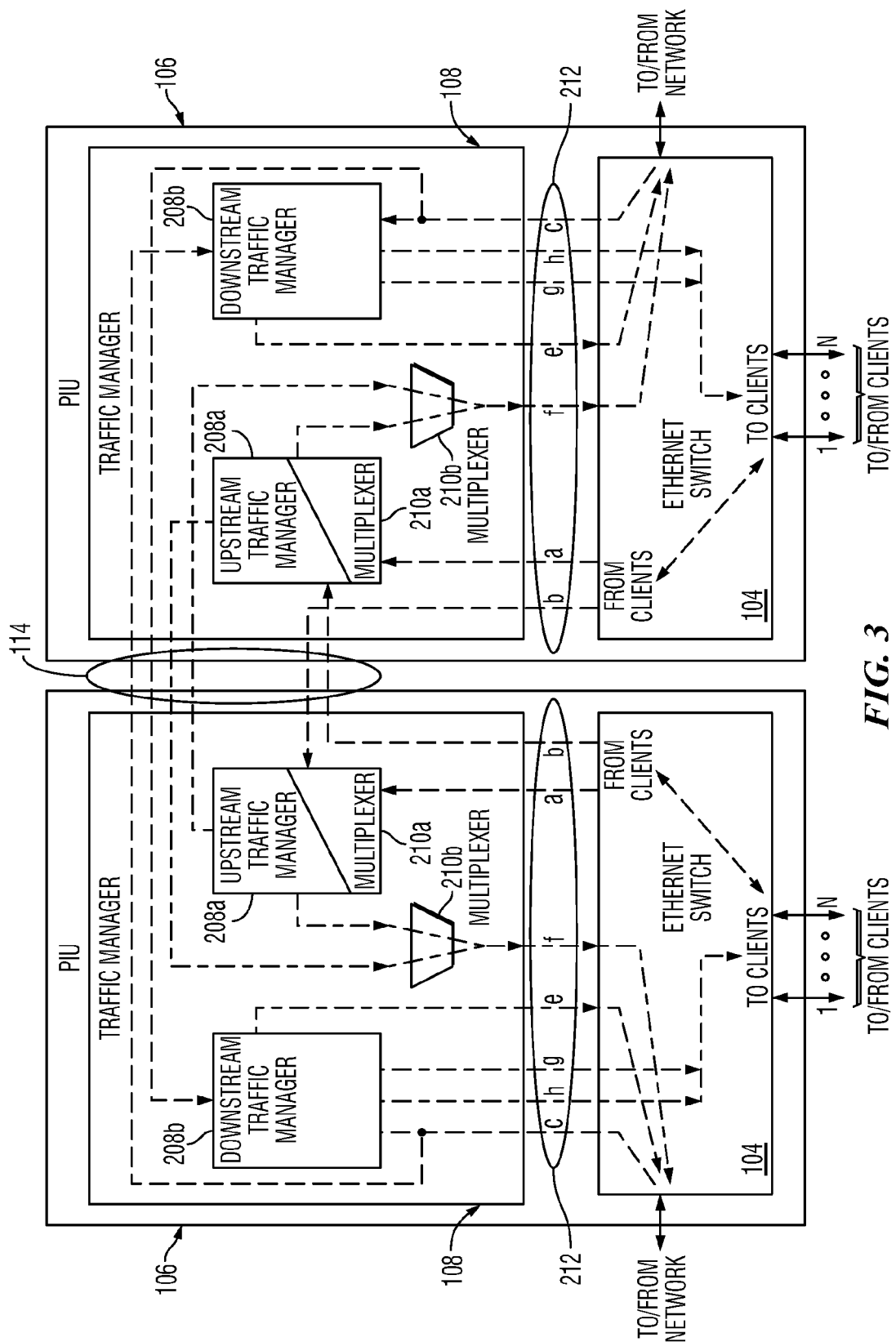
FIG. 3 illustrates a block diagram of the example network element of FIG. 2 including flow paths through various components of the network element, in accordance with certain embodiments of the present disclosure.

FIG. 3 illustrates a block diagram of the network element 102 of FIG. 2 including flow paths through various components of network element 102, in accordance with certain embodiments of the present disclosure. As shown in FIG. 3, each traffic manager 108 may include an upstream traffic manager 208*a*, a downstream traffic manager 208*b*, and one or more multiplexers 210. An upstream traffic manager 208*a* may be configured to shape and/or police traffic originating from client ports 110*a* and destined for network ports 110*b*. On the other hand, a downstream traffic manager may be configured to shape and/or police traffic originating from a network port 110*b* and destined for either or a client port 110*a* or another network port 110*b*. A multiplexer 210 may be any system, device, or apparatus configured to receive a plurality of input signals and select one or more of such input signals to be forwarded to its output.

In embodiments in which one or more LAGs exists across PIUs 106 (e.g., a LAG including client ports 110*a* from two PIUs 106 in a network element 102) for traffic ingressing from client ports 110*a* and destined for network ports 110*b* (which may be referred to herein as "upstream traffic"), an upstream traffic manager 208*a* of a particular PIU 106 may be configured to police and/or shape traffic from client ports 110*a* interfaced to the particular PIU 106 and client ports 110*a* interfaced to another PIU 106, as shown by paths labeled "a" and "b" in FIG. 3. Accordingly, an upstream traffic manager 208*a* of a particular PIU 106 may include a multiplexer 210*a* to merge traffic from client ports 110*a* interfaced to the particular PIU 106 and another PIU 106 of a network element 102, such that traffic within the same LAG may be merged together. After passing through an upstream traffic manager 208*a*, the upstream traffic may be communicated to a network port 110*b* on either PIU 106, as indicated by paths labeled "f" in FIG. 3. A multiplexer 210*b* may be used to merge the upstream traffic from the upstream traffic managers 208*a*.

As a specific example regarding processing of upstream traffic, a switching element 104 may be interfaced to both optical client ports 110*a* and metal-wire client ports 110*a*, as mentioned above (e.g, a switching element 104 may be interfaced to 12 optical client ports 110 and 12 metal-wire client ports 110*a*). Client ports 110*a* may be configured for 0:2 link aggregation such that one LAG includes optical client ports 110*a* and another LAG includes metal-wire client ports 110*a*. In this example, optical client port 110*a* upstream traffic may be sent to an upstream traffic manager 208*a* on one PIU 106, while metal-wire client port 110*a* upstream traffic may be sent to an upstream traffic manager 208*a* on another PIU 106.

For traffic ingressing from network ports 110*b* and destined for client ports 110*a* (which may be referred to herein as "downstream traffic"), such ingress traffic may be communicated to the downstream traffic manager 208*b* of the ingress PIU 106 and the downstream traffic manager 208*b* of another PIU 106 of network element 102 as indicated by paths labeled "c" in FIG. 3. Each downstream traffic manager 208*b* may select from the traffic communicated to it traffic destined for clients interfaced to the PIU 106 on which such downstream traffic manager 208*b* resides and forward such traffic to the appropriate client port 110*a*, as indicated by paths labeled "g" and "h" in FIG. 3. The destination for a frame of traffic may be provided by switching element 104 and may be part of the frame metadata which may be read by traffic manager 108 in order to properly select and forward frames. A downstream traffic manager may also shape traffic for a destination client port 110a to prevent downstream traffic from exceeding client port speed (which might result in lost frames) and/or to ensure traffic flow effectively utilizes the port speed assigned to the client.

For traffic ingressing from a network ports 110b and destined for a network port on another PIU 106 (which may be referred to herein as "network-to-network traffic"), such ingress traffic may be communicated to the downstream traffic manager 208b of the ingress PIU 106 and the downstream traffic manager 208b of another PIU 106 of network element 102 as indicated by paths labeled "c" in FIG. 3. Each downstream traffic manager 208b may select from the traffic communicated to it traffic destined for network ports 110b interfaced to the PIU 106 on which such downstream traffic manager 208b resides and forward such traffic to the appropriate network port 110b, as indicated by paths labeled "e" in FIG. 3. A downstream traffic manager 208b may shape traffic destined for a network port 110b on a PIU 106 on which such downstream traffic manager 208b resides such that the sum of upstream traffic (indicated by paths labeled "e") and network-to-network traffic (indicated by paths labeled "f") for such network port 110b do not exceed the network port 110b rate.

Figure 4:
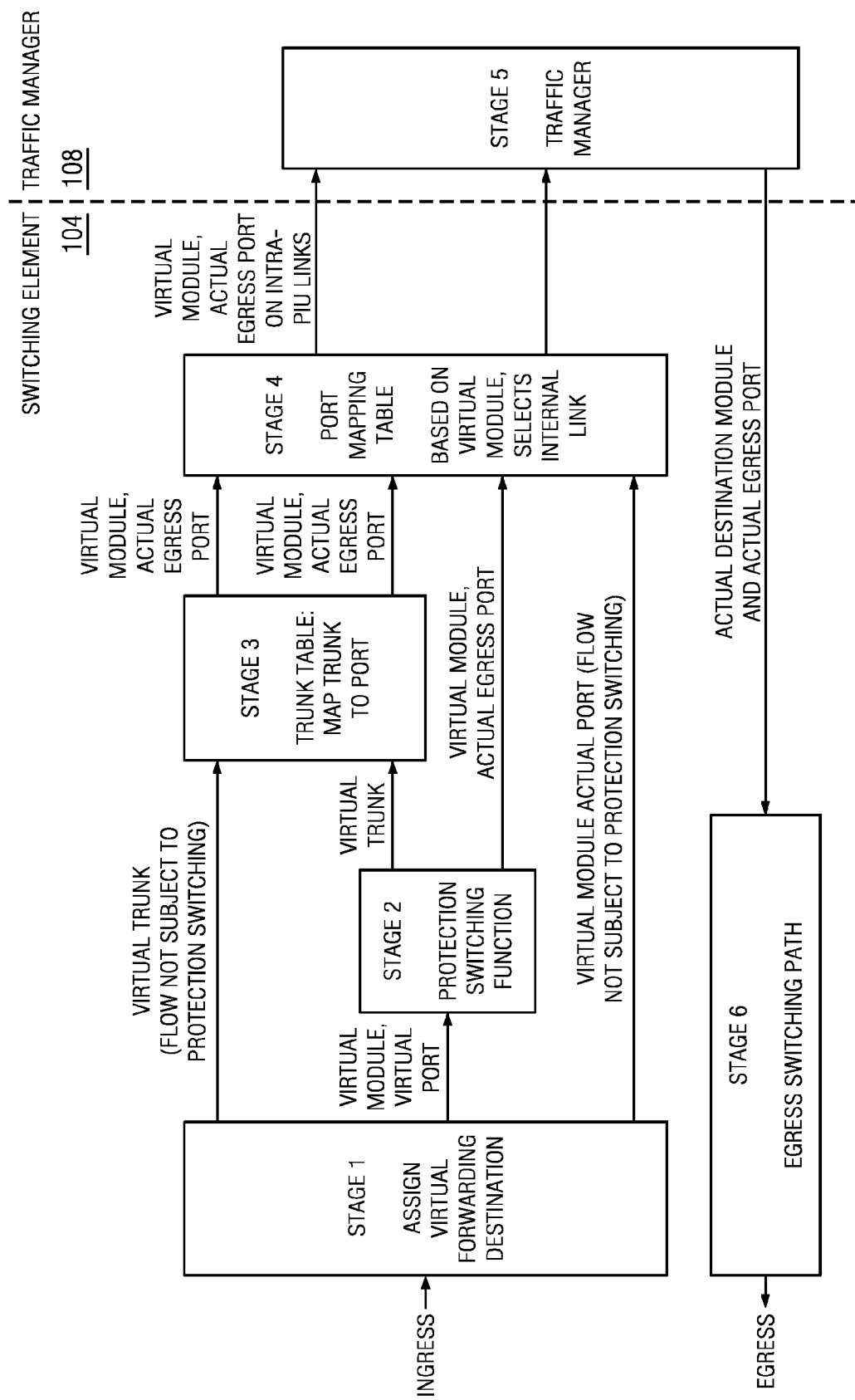
FIG. 4 illustrates a block diagram depicting an example implementation of virtual forwarding, in accordance with certain embodiments of the present disclosure.

FIG. 4 illustrates a block diagram depicting an example implementation of virtual forwarding, in accordance with certain embodiments of the present disclosure. In general, virtualized forwarding, in the context of the present disclosure, utilizes a virtualized destination address, in which different destination attributes for a flow or group of flows are employed at different stages of a flow processing pipeline. At ingress to a network element 102, a switching element 104 or another component of network element 102 may assign a virtual destination address to specific flows or groups of flows. The virtual destination address assigned at ingress may be used as a routing meta tag that identifies flows with the same forwarding criteria, may be used to control internal switching paths of the flows within a network element 102, and may be used to determine an egress port 110 for a flow. The virtual destination address may be modified as it progresses through a network element 102, until such time as the virtual destination address is replaced with an actual destination address. An actual destination address may include an actual module (e.g., PIU 106) and actual port 110 at egress. Where multiple PIUs 106 exist in a system, each PIU may be assigned a module identifier (ID), which may be combined with a port ID to specify a specific egress port 110 of a network element 102. Virtual module IDs may be used internally in a network element 102 to direct internal packet switching before being replaced with an actual module ID prior to egress. FIG. 4 depicts an example implementation for virtual forwarding that includes six stages. In other embodiments, additional stages of virtualization may be possible (e.g., where a network element 102 includes multiple interconnected shelves).

At Stage 1 of the example depicted in FIG. 4, switching element 104 or another component of network element 102 may assign a virtual destination address for packet forwarding. For example, the assigned virtual destination address may identify a virtual trunk for a flow (e.g., for flows associated with a LAG but not subject to G.8031 protection switching or other protection switching), may identify a virtual module and virtual port for a flow (e.g., for flows subject to G.8031 protection switching or other protection switching), or may identify a virtual module and actual port for a flow (e.g., for flows not associated with a LAG and not subject to protection switching).

At Stage 2, a virtual destination address comprising a virtual module and virtual port for a flow subject to protection switching may be translated (e.g., by switching element 104 or another component of network element 102) into a virtual destination address identifying either a virtual trunk or a virtual module and actual port for a specific protection group. Stage 2 may only be applied to those flows subject to protection switching.

At Stage 3, switching element 104 or another component of network element 102 may translate a virtual destination address comprising a virtual trunk to a virtual destination address identifying a virtual module and actual egress port. Such translation may be made in accordance with a hashing function, translation table, or in any other suitable manner.

At Stage 4, switching element 104 or another component of network element 102 may, based on the virtual module identified in the virtual destination address, select an intra-PIU link 112 upon which a flow may be communicated to a traffic manager 108. The virtual destination address may not be modified at Stage 4, and thus may continue to identify a virtual module and actual port as a flow is communicated to Stage 5.

At Stage 5, a traffic manager 108 may replace the virtual module of the virtual destination address with an actual module, thus effectively replacing the virtual destination address with an actual destination address. After buffering, shaping, and/or policing of the flow, traffic manager 108 may communicate the flow to the proper switching element 104 for egress.

At Stage 6, a switching element 104 or another component of network element 102 may, based on the actual destination address (actual module, actual port), switch the flow to the proper egress port 110 for the flow.

Figure 5:
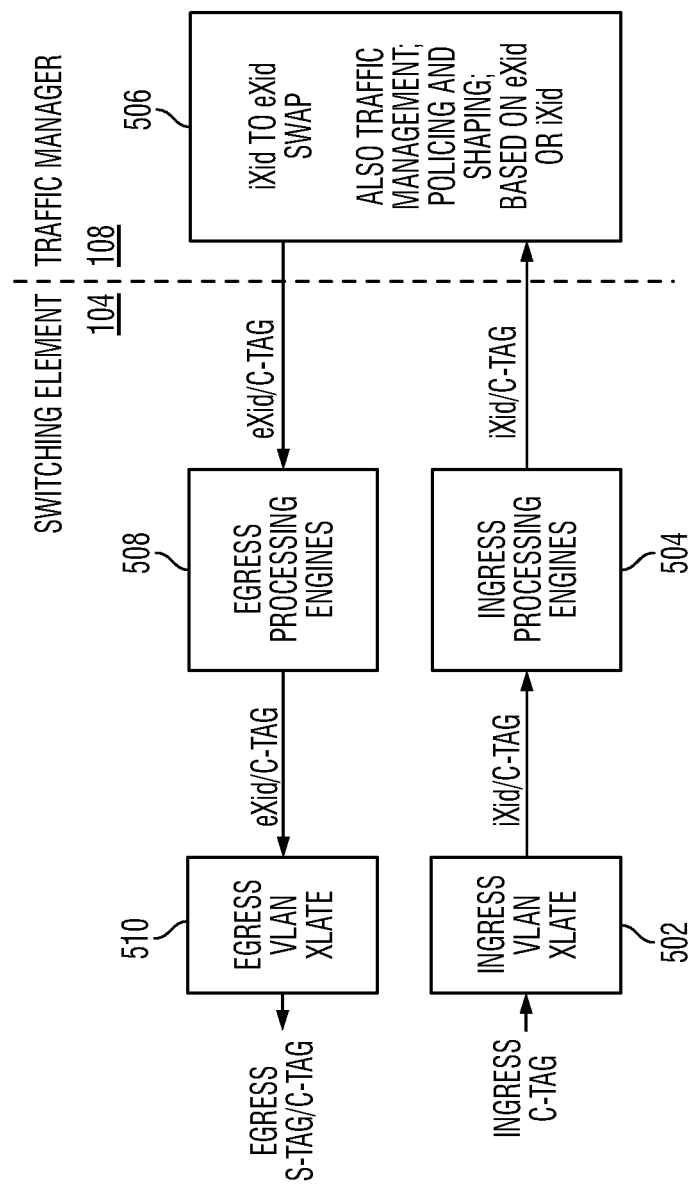
FIG. 5 illustrates a block diagram depicting an example implementation of assigning contextualized flow tags, in accordance with certain embodiments of the present disclosure.
Figure 6:
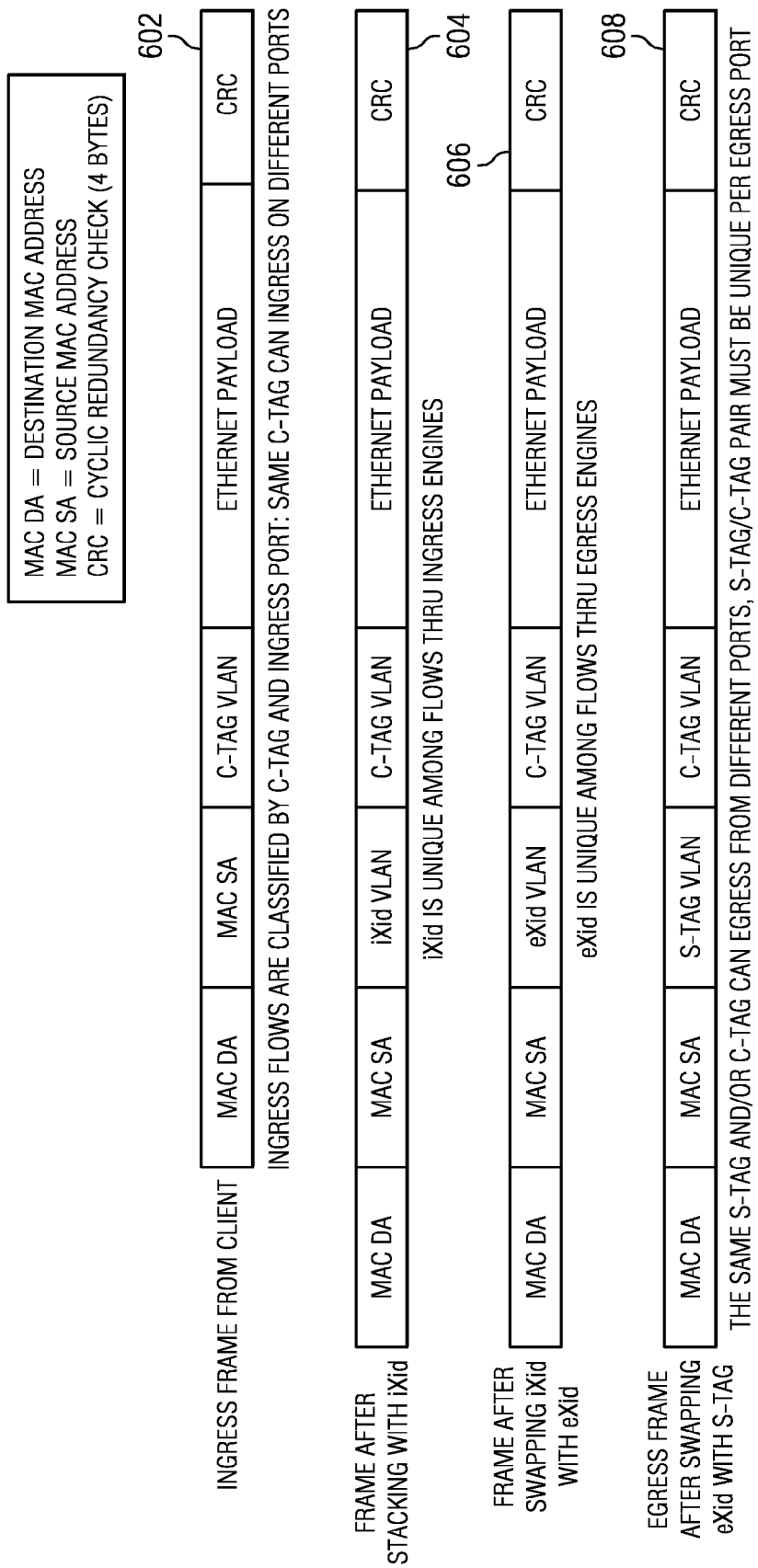
FIG. 6 illustrates a traffic frame having contextualized flow tags assigned, in accordance with certain embodiments of the present disclosure.

FIG. 5 illustrates a block diagram depicting an example implementation of assigning contextualized flow tags, in accordance with certain embodiments of the present disclosure. FIG. 6 illustrates a traffic frame having contextualized flow tags assigned, in accordance with certain embodiments of the present disclosure. Each of FIGS. 5 and 6 contemplates assignment of contextualized flow tags in use cases involving upstream traffic in which a C-tag is present upon ingress and an S-tag is added upon egress. In the example depicted in FIGS. 5 and 6, a frame may enter a network element 102 via a client port 110a. Such frame may be in the form shown at line 602 of FIG. 6, and may include a C-tag. As shown in block 502 of FIG. 5 and line 604 of FIG. 6, the frame may be stacked (e.g., by switching element 104 or another component of network element 102) with another VLAN tag at ingress, which may be referred to as an ingress connection ID or iXid. Such iXid tag may be unique among all ingress flows and independent from the ingress and/or egress port 110 of the frame. After this ingress stacking stage, the C-tag may be carried as frame payload, and the iXid may occupy the position in the VLAN frame normally occupied by an S-tag. As shown in block 504 of FIG. 5, the iXid may be used by switching element 104 to classify all ingress flows through ingress logic engines of switching element 104.

Switching element 104 may then communicate the frame to traffic manager 108. As indicated by block 506 of FIG. 5, traffic manager 108 may swap the iXid for an egress connection ID or eXid. The eXid may occupy the same frame position as the iXid, as shown by line 606 of FIG. 6. Traffic manager 108 may also perform policing based on the eXid and/or the iXid, and may perform shaping based on the eXid.

Traffic manager 108 may then communicate the frame to switching element 104. As shown in block 508 of FIG. 5, the eXid may be used by switching element 104 to classify all egress flows through egress logic engines of switching element 104. After processing by logic engines, switching element 104 may translate the eXid to an S-tag, as shown by block 510 of FIG. 5 and line 608 of FIG. 6.

The example above contemplates a frame configured to flow from a client with a C-tag on ingress to a network with an S-tag on egress. However, principles similar to the example described above may also be applied to other types of flows.

For example, in a frame configured to flow from a client with a C-tag on ingress to a network with a C-tag on egress, an iXid may be stacked on ingress, swapped with the eXid for egress, and the eXid may be stripped on egress to the network. In addition, the C-tag may be swapped for another C-tag on egress.

As another example, in a frame configured to flow from a network with an S-tag on ingress to a network with a C-tag on egress, the S-tag may be swapped to an iXid on ingress, then swapped to an eXid for egress, and the eXid may be stripped on egress to the client.

As a further example, in a frame configured to flow from a client with an S-tag on ingress to a network with an S-tag on egress, the S-tag may be swapped to an iXid on ingress, then swapped to an eXid for egress. The eXid may be swapped for an S-tag for egress, which may be the same or different from the ingress S-tag.

The use of iXids and eXids may have numerous benefits. For example, and iXids may provide a unique identifier for all ingress flows based on a single tag. The iXid tag can be used to classify flows for ingress profiles, policing, and forwarding. It may avoid the need to classify based on a combination of double tags, and/or based on tag(s) and ingress port.

Advantages of mapping iXids to eXids may allow convergence of iXids to fewer eXids (e.g., an iXid may be based on a client's C-tag and ingress port, while eXid is based on a grouping of such flows). This may reduce required egress resources—especially if flows are to be duplicated for protection on egress.

Among the advantages of eXids is the ability to classify flows with a single tag that receive common treatment for egress shaping, egress profiling, forwarding (including flow protection) based on such single tag.

A component of network 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 without departing from the scope of the invention. The components of network 10 may be integrated or separated. Moreover, the operations of network 10 may be performed by more, fewer, or other components. Additionally, operations of network 10 may be performed using any suitable logic. As used in this document, "each" refers to each member of a set or each member of a subset of a set.

Certain embodiments of the invention may provide one or more technical advantages. A technical advantage of one embodiment may be that alarm indication signals that typically originate from maintenance end points may be transmitted in the event that equipment upon which the maintenance end points have experienced a fault, thus reducing the occurrence of unnecessary alarms.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A network element comprising:
a first plug-in unit comprising:
    a first switching element, the first switching element comprising a switch fabric having a plurality of inputs and outputs; and
    a first traffic manager comprising:
        a first upstream traffic manager directly coupled to the first switching element; and
        a first downstream traffic manager directly coupled to the first switching element;
a second plug-in unit comprising:
    a second switching element, the second switching element comprising a switch fabric having a plurality of inputs and outputs; and
    a second traffic manager comprising:
        a second upstream traffic manager directly coupled to the second switching element and coupled to the first upstream traffic manager; and
        a second downstream traffic manager directly coupled to the second switching element and coupled to the first downstream traffic manager;
wherein the first upstream traffic manager is configured to:
    receive flows from a first group of client ports directly coupled with each of the first switching element and the second switching element;
    police and shape flows from the first group of client ports; and
    communicate the policed and shaped flows from the first group of client ports to one or more network ports via each of the first switching element and the second switching element;
wherein the second upstream traffic manager is configured to:
    receive flows from a second group of client ports directly coupled with each of the first switching element and the second switching element;
    police and shape flows from the second group of client ports; and
    communicate the policed and shaped flows from the second group of client ports to one or more network ports via each of the first switching element and the second switching element;

wherein the first downstream traffic manager is configured to:
  receive flows from at least one of a first network port directly coupled with the first switching element and a second network port directly coupled with the second switching element;
  police and shape flows from at least one of the first network port and the second network port; and
  communicate the policed and shaped flows from at least one of the first network port and the second network port to one or more client ports directly coupled with the first plug-in unit; and
wherein the second downstream traffic manager is configured to:
  receive flows from at least one of the first network port and the second network port;
  police and shape flows from at least one of the first network port and the second network port; and
  communicate the policed and shaped flows from at least one of the first network port and the second network port to one or more client ports directly coupled with the second plug-in unit; and
a first multiplexer configured to merge the policed and shaped flows from the first upstream traffic manager and the second upstream traffic manager and communicate the first merged flows to the first switching element; and
a second multiplexer configured to merge the policed and shaped flows from the first upstream traffic manager and the second upstream traffic manager and communicate the second merged flows to the second switching element.

2. A network element according to claim 1, wherein at least one of the first group of client ports and the second group of client ports is a link aggregation group.

3. A method comprising:
  receiving, at a first upstream traffic manager, flows from a first group of client ports directly coupled with each of a first switching element and a second switching element, the first and second switching elements each comprising a switch fabric having a plurality of inputs and outputs;
  policing and shaping, at the first upstream traffic manager, flows from the first group of client ports;
  communicating, from the first upstream traffic manager, the policed and shaped flows from the first group of client ports to one or more network ports via each of the first switching element and the second switching element;
  receiving, at a second upstream traffic manager, flows from a second group of client ports directly coupled with each of the first switching element and the second switching element;
  policing and shaping, at the second upstream traffic manager, flows from the second group of client ports;
  communicating, from the second upstream traffic manager, the policed and shaped flows from the second group of client ports to one or more network ports via each of the first switching element and the second switching element;
  receiving, at a first downstream traffic manager, flows from at least one of a first network port directly coupled to the first switching element and a second network port directly coupled to the second switching element;
  policing and shaping, by the first downstream traffic manager, flows from at least one of the first network port and the second network port; and
  communicating, from the first downstream traffic manager, the policed and shaped flows from at least one of the first network port and the second network port to one or more client ports directly coupled to the first switching element;
  receiving, at a second downstream traffic manager, flows from at least one of the first network port and the second network port;
  policing and shaping, by the second downstream traffic manager, flows from at least one of the first network port and the second network port;
  communicating, from the second downstream traffic manager, the policed and shaped flows from at least one of the first network port and the second network port to one or more client ports directly coupled to the second switching element;
  merging the policed and shaped flows from the first upstream traffic manager and the second upstream traffic manager and communicating the first merged flows to the first switching element; and
  merging the policed and shaped flows from the first upstream traffic manager and the second upstream traffic manager and communicating the second merged flows to the second switching element.

4. A method according to claim 3, wherein at least one of the first group of client ports and the second group of client ports is a link aggregation group.

5. A method according to claim 3, wherein:
the first upstream traffic manager and the first downstream traffic manager are integral parts of a first traffic manager; and
the second upstream traffic manager and the second downstream traffic manager are integral parts of a second traffic manager.

6. A method according to claim 5, wherein:
the first traffic manager is an integral part of a first plug-in unit; and
the second traffic manager is an integral part of a second plug-in unit.

* * * * *